United States Patent [19]
Petersen et al.

[11] Patent Number: 5,963,564
[45] Date of Patent: Oct. 5, 1999

[54] SYNCHRONIZING THE TRANSMISSION OF DATA VIA A TWO-WAY LINK

[75] Inventors: Lars Göran Petersen, Tumba; Mikael Kundel, Arsta, both of Sweden

[73] Assignee: Telefonaktiebolaget LM Ericsson, Stockholm, Sweden

[21] Appl. No.: 08/989,167

[22] Filed: Dec. 11, 1997

Related U.S. Application Data

[63] Continuation of application No. PCT/SE96/00773, Jun. 13, 1996.

[30] Foreign Application Priority Data

Jun. 13, 1995 [SE] Sweden ................................. 9502142

[51] Int. Cl.⁶ ..................................................... H04J 3/06
[52] U.S. Cl. .......................... 370/503; 370/395; 370/465; 375/354
[58] Field of Search ................................... 370/465, 503, 370/507, 510, 515, 516, 394, 395; 375/354, 356, 368, 357

[56] References Cited

U.S. PATENT DOCUMENTS

| | | | |
|---|---|---|---|
| 3,619,510 | 11/1971 | Zegers et al. ............................. | 370/515 |
| 4,622,665 | 11/1986 | Jönsson et al. .......................... | 370/516 |
| 5,123,013 | 6/1992 | Hirayama .............................. | 370/105.4 |
| 5,251,239 | 10/1993 | Turban et al. ........................... | 375/368 |
| 5,398,249 | 3/1995 | Chen et al. .............................. | 370/510 |
| 5,568,486 | 10/1996 | Huscroft et al. ......................... | 370/465 |

FOREIGN PATENT DOCUMENTS

| | | | |
|---|---|---|---|
| 0 607 672 | 7/1994 | European Pat. Off. ........ | H04L 12/56 |
| 38 42 371 | 6/1990 | Germany .......................... | H04L 5/22 |
| 9402051 | 5/1996 | Sweden ........................... | H04L 12/56 |
| 1 550 121 | 7/1976 | United Kingdom ........... | H03K 13/00 |

OTHER PUBLICATIONS

Bellcore, Bell Communication Research, "Broadband ISDN Transport Network Elements Framework Generic Cirteria", FA-NWT-001109, Issue 1, pp. 1–96, 1990.

*Primary Examiner*—Dang Ton
*Assistant Examiner*—Shick Hom
*Attorney, Agent, or Firm*—Burns, Doane, Swecker & Mathis, L.L.P.

[57] ABSTRACT

Transmission is synchronized in a cell based switch of user cells which can include different numbers of data bits. The transmission is performed via a two-way link between functional entities which each includes a link control function containing functions for starting and controlling transmission of data on the link by sync cells which are exchanged between the link control functions. The exchange of sync cells is controlled by a sync state machine having three states. In a HUNT state, the link control function investigates a sync cell coming in from the link for establishing whether it agrees with a predetermined pattern for sync cells. In a PRESYNC state that starts after a sync cell contains the predetermined pattern has been found in the HUNT state, the link control function investigates a predetermined number thereafter incoming consecutive sync cells for establishing whether they contain the predetermined pattern. If this is not the case, the control process returns to the HUNT state. In a SYNC state that starts after the predetermined number of sync cells containing the predetermined pattern has been found in the PRESYNC state, transmission of data on the link is admitted while supervising data with respect to faults. If faults are found the control process is started again in the HUNT state.

20 Claims, 6 Drawing Sheets

SYNCHRONIZING THE TRANSMISSION OF DATA VIA A TWO-WAY LINK

This application is a continuation of International Application No. PCT/SE96/00773, filed Jun. 13, 1996, which designates the United States.

BACKGROUND

According to a first aspect the present invention relates to a method and a system for synchronizing, in a cell based switch, transmission of user cells which can include different numbers of data bits, between switch ports and switch core via a two-way link.

According to a second aspect the invention relates to a system for synchronizing in a data transfer system the transmission of data in the form of a bit stream between functional entities via a two-way link, each functional entity having means for applying data arriving from users and intended for transmission on the link, in user cells which can include different numbers of data bits depending upon the size of the respective user data.

In many data transmission systems different functional entities are connected together via a link. In particular this is the case in telecommunication systems. The link cost in many cases depends upon the number of physical interconnections. The more interconnections the higher the cost will be. It is therefore a usual practice to apply all information required on a single physical connection carrying a digital signal. This makes it necessary to reconstruct the logical structure at the receiving end of the link. For performing this implicit information must be transferred that points to the structure on different levels.

Examples of implicit information which is coded in the digital signal is the clock that enables performing of bit alignment, and a synchronizing pattern which enables performing alignment on octets, words, ATM cells, or every other higher structure than bits.

Synchronizing in connection with transmission of ATM cells results in problems, in particular in case of different cell sizes appearing.

A link for transferring ATM cells has a cell synchronizing mechanism based upon the so-called HEC Field (Header Error Correction Field) in the ATM cell and the process flow. A form of calculation denominated HCS (Header Check Sum) is based upon the four continuing octets and the remainder that is included in HEC. The process flow is based upon a state machine having states HUNT, PRESYNC and SYNC. A well known state machine for this purpose is described in the Bellcore document FA-NWT-001109.

A correct HCS calculation forces the state machine in question to a state PRESYNC. Provided that six consecutive correct HCS calculations appear in this state transition is performed to a state SYNC, otherwise transition is performed to a state HUNT. After seven consecutive incorrect HCS calculations in the state SYNC, transition is likewise performed to the state HUNT.

An essential disadvantage with use of such a closed state machine that operates without support from the originating side is the time consumption for reaching the synchronizing state, and accordingly the cell loss when synchronization is lost. More than 60 cells can be lost before the link is brought to an operative state. Another disadvantage is that the method in question does not admit transmission of cells of different sizes on the link.

In the U.S. Pat. No. 5,123,013 there is described cell synchronization in a packet connected system for sending and receiving a cell train composed of data cells of a fixed lenght including data to be transmitted. At least one synchronizing cell containing a synchronization pattern is inserted between the data cells.

The synchronization cell or cells are transmitted in certain situations, viz. during a time period in which no data cell is transmitted, or after data cells have been transmitted successively during a predetermined interval after the transmission of the synchronization cell.

GB 1,550,121 describes a speed tolerant digital data decoding system. Digital words are stored in cells of approximately the same width, except for the initial cell of each word which is called sync cell and has the double width.

DE 3,842,371 relates to an arrangement for clock synchronization of a cell structured digital signal.

SUMMARY OF THE INVENTION

An object of the invention is to provide a method for cell alignment in a bit stream that contains cells of different sizes. Generally, this is attained in accordance with the invention by using a fast synchronization algorithm based upon small synchronization cells and use of suitable devices on each side of a two-way link.

In a method according to a first aspect the transmission of data on the link is started and supervised by means of sync cells which are exchanged between the functional entities and each contains, on the one hand a synchronizing pattern, by means of which the sync cell can be identified, and, on the other hand, control data. By the functional entitites control data can be set to values admitting mutual checking that synchronism prevails, or a value that in a state of operation on the link, that is apprehended as implying loss of synchronism, forces the functional entities to take measures for reinstating synchronism.

In a system according to the first aspect a link control function is included in each functional entity containing functions for starting and controlling the transmission of data on the link by means of sync cells which are exchanged between the link control functions controlled by a sync state machine that has three states. In a HUNT state the link control function is brought to investigate a sync cell coming in from the link for determining whether it agrees to a predetermined pattern for sync cells. In a PRESYNC state, preceded by a sync cell being in agreement with the predetermined pattern having been found in the HUNT state, the link control function is brought to investigate a predetermined number of consecutive sync cells coming in thereafter for determining whether they agree to the predetermined pattern. Return to the HUNT state is performed if this is not the case. In a SYNC state, preceded by the predetermined number of sync cells having shown agreement with the predetermined pattern in the PRESYNC state, transfer of data on the link is admitted while supervising data with respect to errors. Transition to the HUNT state is performed if an error is found.

In a system according to a second aspect a link control function is included in each functional entity with functions for starting and controlling the transfer of data on the link by means of sync cells, which are exchanged between the link control functions and each include, on the one hand, identification information, by means of which the sync cell can be identified, and, on the other hand, control data. By each link control function the control data can be given values which admit mutual check that synchronism exists, or a value which in an operational state on the link apprehended as meaning loss of synchronism, forces the two link control functions to take measures to reinstate synchronism. An output function towards the link has a sync cell inserting function that receives a stream of user cells and in this inserts sync cells, and a first transforming function that receives the resulting stream consisting of user cells and sync cells and transforms this to a bit stream signal, that is clocked with a 1-bit clock signal out onto the link. An input function from the link comprises a second transforming function that receives a bit stream signal coming in from the link and transforms this to an n-bit parallel format, that is normally clocked out for each n:th bit with an n-bit clock signal from the input function. A comparison function is connected for searching and identifying in the n-bit parallel format the identification information of a sync cell, and when it is found emit a confirmation signal. A clocking function enables clocking out for each bit with a 1-bit clock signal of the n-bit parallel format from the input function. A sync state machine receives the confirmation signal for controlling the transition from clocking of the n-bit parallel format with the n-bit clock signal to clocking with the 1-bit clock signal.

Important advantages of the invention are the fast synchronization and that it allows appearance of different cell sizes.

DESCRIPTION OF THE DRAWINGS

The invention will now be described more closely below with reference to the attached drawings on which FIG. 1 schematically shows a telecommunication switch intended for both ATM and STM line connections, in which the invention can be used, FIG. 2 more in detail and on a larger scale shows a part of the switch according to FIG. 1, including a two-way transmission link between a switch port and the switch core, for illustrating some main aspects of the inventive idea, FIGS. 5 and 6 show examples of embodiments of a synchronization cell and a user cell, respectively, FIG. 7 in some detail shows a functional diagram of an embodiment of a link control system according to the invention as included in each switch port and switch core, according to FIG. 3.

DETAILED DESCRIPTION

Figure 1:
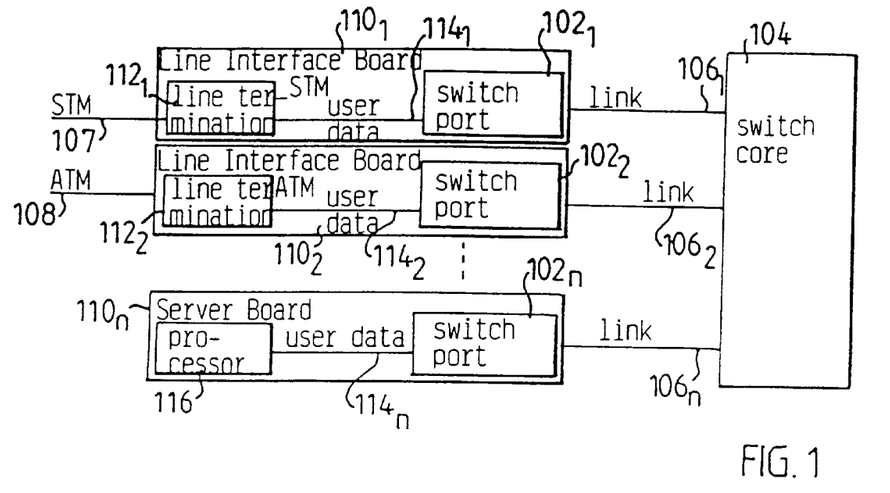

FIG. 1 shows a cell based telecommunication switch intended for both ATM (Asynchronous Transfer Mode) and STM (Synchronous Transfer Mode) line connections. The switch includes a plurality of switch ports $102_1$–$102_n$ connected to a switch core 104 via each a two-way link $106_1$–$106_n$. The switch ports 102 are connected to e.g. a communication network that can contain e.g. incoming lines 107 and 108, processors etc. The lines 107 and 108 can carry ATM cells or STM time slots. The switch ports $102_1$ and $102_2$ are shown schematically as an example to be located on a line interface circuit card $110_1$ for STM line connection and a line interface circuit card $110_2$ for ATM line connection, respectively. The line interface circuit cards $110_1$ and $110_2$ are also shown schematically as containing each a respective line termination $112_1$ and $112_2$ which via a respective link $114_1$ and $114_2$ for user data is connected with the corresponding switch port $102_1$ and $102_2$, respectively. The switch port $102_n$ is schematically shown as an example to be located on a server card $110_n$ which includes a processor 116 connected to the switch port via the link $114_n$ for user data.

Figure 2:
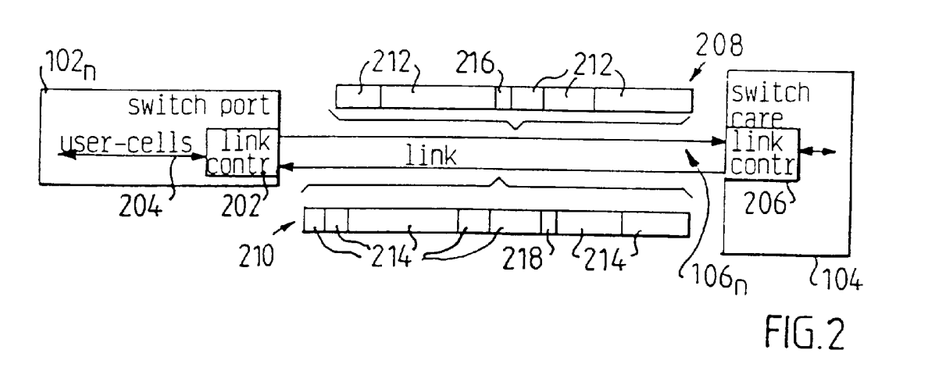

FIG. 2 illustrates the two-way traffic between e.g. the switch port $102_n$ and the switch core 104 via the link $106_n$ more in detail. The switch port $102_n$ applies arriving user data in user cells. The size of these user cells is chosen so as to suit the user data. For an ATM cell of 53 octets a user cell size of 56 octets can thus be chosen, i.e. 53 bytes plus cell size information plus checksums. STM time slots are applied in smaller cells. The user cell is then guided from a switch port to another one through the switch core. For a more detailed description of the technique of applying user data in user cells, and different circumstances in this context reference is made to Swedish patent application No. 9402051-8.

The switch port $102_n$ contains a link control function 202 that receives user cells based upon user data arriving from the outside to be forwarded on the link $106_n$, and emits user cells arriving from the link, the data of which shall be sent out on e.g. the network, indicated by double arrow 204. The traffic between the switch port $102_n$ and the switch core 104 proceeds between the link control function 202 and a link control function 206 in the switch core. The link control functions 202 and 206 manage the cell synchronization, as will be described more closely below.

Cells of different sizes are transmitted on the link as a bit stream in both directions, said bit streams being schematically indicated at 208 and 210. In the bit streams 208 and 210 user cells are indicated at 212 and 214, respectively. No explicit information regarding the beginning of a cell is transferred. Both sides must therefore perform cell alignment for synchronizing the link. For this purpose sync cells are used which at need are introduced into the user cell flow. In the bit streams 208 and 210 a sync cell is indicated at 216 and 218, respectively, as an example. The sync cells are originated and terminated in the link control function 202 and 206, respectively on each side, i.e. they do not appear in the switch ports or the switch core outside the link control functions. The user cells are guided unaffected through the link control functions. The execution and way of operation of the link control functions will appear more in detail from the following description of embodiments.

Figure 3:
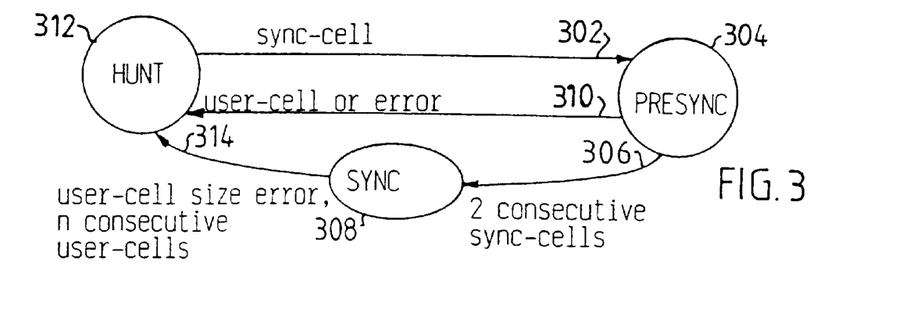
FIG. 3 shows a sync state diagram for a sync state machine used in connection with cell synchronization performed in accordance with the invention on the transmission link according to FIG. 2.

FIG. 3 shows a sync state diagram illustrating the way of operation of a state machine for the link control functions on each side of the link, which is used for synchronizing the link. Sync cells coming from the link to a link control function are compared with a predetermined pattern for sync cells. A first detected agreement between an incoming sync cell and the predetermined pattern forces the state machine according to arrow 302 to a state 304 PRESYNC. Provided that thereafter two consecutive sync cells in the state PRESYNC are found, which show agreement with the predetermined pattern, transition is performed, arrow 306, to a state 308 SYNC, otherwise transition is performed, arrow 310, to a state 312 HUNT. The method according to the invention is based upon the consecutive transmission of sync cells during the PRESYNC state. In the SYNC state user cells can be transmitted. Each user cell must include information enabling maintenance of the cell synchronization, and furthermore have error codes making it possible to detect an error in the cell size. A detected error in the SYNC state 308 forces likewise the state machine to the state 312 according to the arrow 314. To secure a true SYNC state if the error codes in the user cells cannot be considered enough, also a supervision state machine can be added to the SYNC state. This supervision function forces the state machine to the state 312 according to the arrow 314 if a predetermined number n of consecutive user cells appear. For further elucidation in connection with that mentioned above regarding the construction and desirable properties of user cells, reference is made to the above mentioned Swedish patent application 9402051-8.

To attain fast synchronization and for keeping the link in an operative state it is required that the link control unit on the side that receives user cells can transmit control data in the sync cells on the link to the link control function on the originating side.

Examples of such control data (commands) and measures caused thereby that can then appear in the link control unit on the originating side are:

1. Control data: abort. Implies instruction to the originating link control unit to stop the current transmission of user cells and instead send a sync cell. The current transmission of sync cells shall be completed and the new sync cell be inserted thereafter.

2. Control data: prompt. Indicates that SYNC state is present and implies instruction to the originating link control unit to return a sync cell at the first suitable point of time. More particularly, the returned sync cell shall be introduced into the normal cell flow so as to involve as little disturbance as possible in normal operation.

3. Control data: sync. Indicates that no sync cell is required in return from the originating side.

Figure 5:
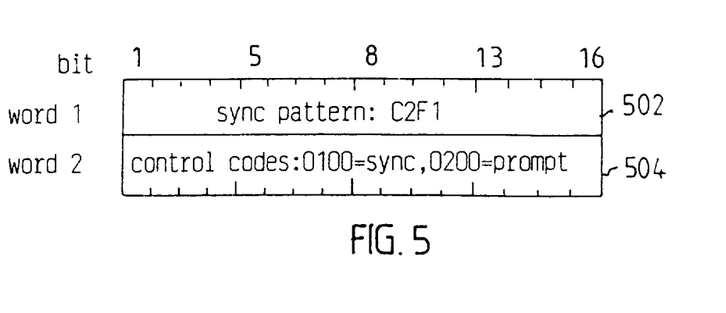

The use of the above three control data or commands will appear more closely below from the description with reference to FIGS. 5, 7 and 8.

The abort command could be replaced by the prompt command as will appear below i.a. in connection with the description with reference to FIG. 5. The result will be a somewhat slower synchronization if a great user cell is transferred at this point of time.

The following sync cell transition rules are applied for the state machine:

1. HUNT/PRESYNC state. Send sync cells to the originating side containing abort or prompt command. The sync cell should be sent at the first suitable point of time without stopping a current cell transmission.

2. SYNC state. Send user cells, or send sync cells if a sync cell with abort or prompt command has been received. If sync cells are returned they should normally contain the control data sync.

Figure 4:
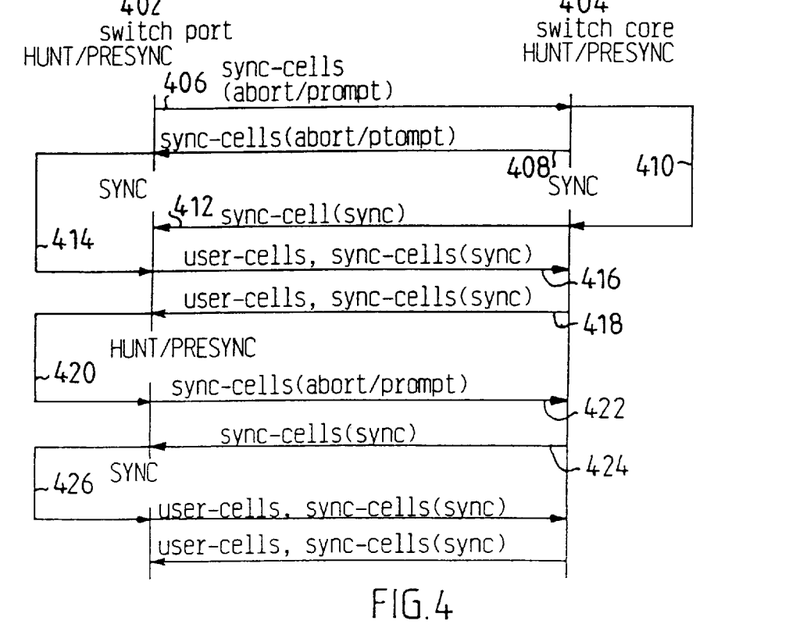
FIG. 4 shows a transaction state diagram between a switch port and switch core while using the sync state machine according to FIG. 3 for a possible practical synchronization scenario.

FIG. 4 schematically shows a simple transaction state diagram between switch port 402 and switch core 404 for a possible synchronization scenario.

At first, both sides are in either of the states HUNT and PRESYNC. Accordingly they are sending sync cells with control data prompt/abort, arrows 406 and 408, respectively. After a defined number of consecutive sync cells both enter the SYNC state. In the shown example, the switch core side 404 passes into the SYNC state according to arrow 410 before the switch port. The switch core therefore responds to the sync cells with control data abort/prompt by sending a sync cell with the control data sync, arrow 412. The switch port 402 now passes into the sync state, arrow 414. The switch port knows that the switch core is already in the SYNC state and therefore allows transmission of user cells, arrow 416. The switch core 404, now receiving user cells, can in turn admit transmission of user cells, arrow 418. The link is now in an operative state on both sides and will remain such until either side enters the HUNT state due to the detection of an error or the supervising function coming into operation.

In this example the switch port 402 is affected and passes into the HUNT state according to arrow 420. The switch port now sends out sync cells with control data abort/prompt according to arrow 422. The switch core 404 must respond by sending sync cells containing the control data SYNC instead of user cells according to arrow 424. After the required number of consecutive sync cells the switch port resumes the SYNC state, arrow 426.

The two sides can check each other in normal operation with respect to they being really in the SYNC state. This can be done by regularly sending sync cells with the control data prompt. The other side should respond within a predetermined time with a sync cell with the control data sync. If this does not occur, it can be assumed that it is in some kind of erroneous SYNC state. The synchronization can e.g. be lost but this is not detected due to the presence of a correct pattern in user cells in the locations where cell analysis is performed and this state can prevail during a longer period of time. The correct measure if no sync cell appears in return is to stop the sending of user cells and force the other side to synchronization. The described method can complete or replace the earlier described supervision function.

A first embodiment of a link control system according to the invention shall now be described more in detail with reference to FIGS. 5–8.

To provide fast synchronization the sync cell should suitably be as small as possible and still as big as to allow a pattern which is improbable to find in the user cells during an uninterrupted period of time. FIG. 5 shows an example of realization of the sync cell. The size of the sync cell is restricted to two words 502 and 504. All codes are given in tetrabinary form. The first word 502 contains a sync pattern hex C2F1. The second word 504 contains a control data field for control data sync and prompt, the latter in this case having replaced abort, a possibility mentioned as an alternative above. According to the main alternative the control data field 504 in FIG. 5 could thus, besides the two control data sync and prompt shown, also include control data abort. In FIG. 5 the codes hex 0100 and hex 0200 are indicated as an example for sync and prompt, respectively.

The transmission direction is bit 1 to 16 and word 1 to 2. The most significant bit in a field is transmitted first. The rightmost bit is least significant. The stated synchronization pattern is only an example; other codes can also be used. The synchronization pattern together with the control codes is chosen so as to enable unambiguous definition of the starting position of the sync cell in a consecutive sequence of sync cells. The control codes are chosen with a Hamming distance of two. Other codes are conceivable.

Figure 6:
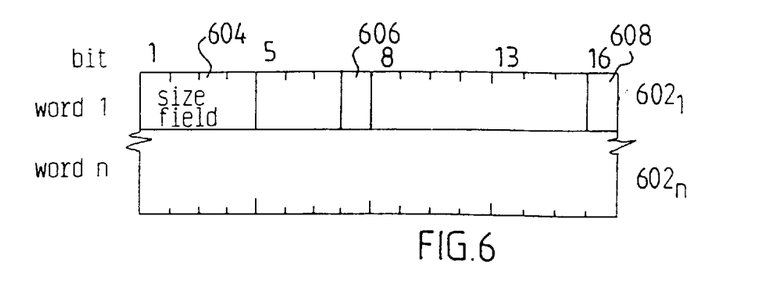

FIG. 6 shows the user cell as containing a number of words $6021_1$–$602_n$. The size field 604 contains codes for different determined sizes with redundant coding that admits error detection. The method is well known and can be based on Hamming code or similar. The user cell also contains two parity bits 606 and 608. Further details can be fetched from the above mentioned Swedish patent application 9402051-8. A code similar to that of the sync cell is not allowed. If an error appears in the size field or the parity bits the state machine according to FIG. 3 enters the HUNT state 312.

Figure 7:
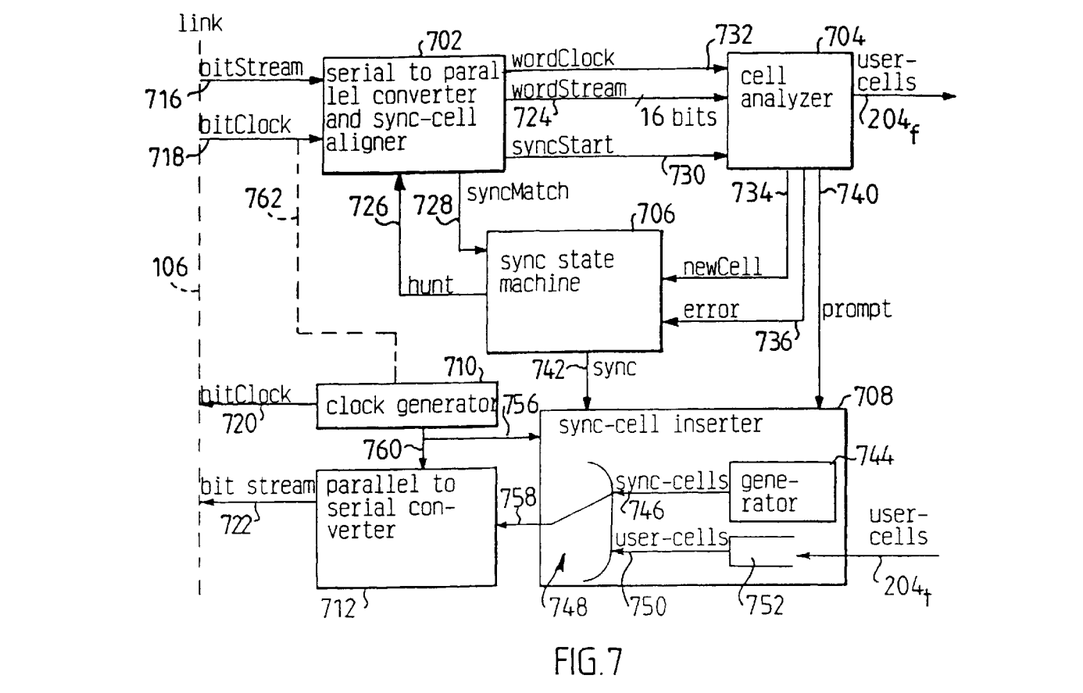

FIG. 7 shows a function block diagram for a link control function of the type that superficially has been described earlier with reference to FIG. 2 and that is included in each switch port and in the switch core. As is the case for FIG. 2 the designation 206 is used in FIG. 7 for the link between the two link control functions, and the designation 204 for the stream of user cells to and from the link control function. In FIG. 7 a partition has however been made so that the stream of user cells from the link control function is designated $204_f$, and the stream of user cells to the link control function is designated $204_t$. The link control function includes a series/parallel converting and sync cell aligning function 702, a cell analysing function 704, a sync state machine 706, a sync cell aligning function 708, a clock generator 710 and a parallel/series converter 712. The function of the sync state machine 706 can be conceived to be according to FIG. 4.

On the link 106 between a switch port and the switch core a bit stream signal and a bit clock signal are transferred in each direction, indicated by arrows 716 and 718 for the receiving direction and arrows 720 and 722 for the sending direction, respectively. S/P converter and sync cell alignment function 702 receives the bit stream 716 and converts it to 16 bits parallel data that is admitted as a word stream 724 to the cell analysing function 704.

Always when the state HUNT is true for the sync state machine 706 it emits a hunt signal 726 to the S/P converter and sync cell alignment function 702 that forces the later to hunt a sync cell pattern for each bit position, cf. FIG. 5. When this pattern has been found the function 702 emits a sync agreement signal 728 to the sync state machine 706 and a sync start signal 730 to the cell analysing function 704. The sync agreement signal 728 forces the sync state machine 706 to the state PRESYNC and deactivates the hunt signal 726. The sync start signal 730 that is only active when the hunt signal 726 is active, indicates to the cell analysing function 704 that a sync cell has been found.

The S/P converter and sync cell alignment function 702 now passes to a parallel mode and clocks the incoming bit stream 716 word by word. Each word is indicated by a word clock signal 732 to the cell analysing function 704. The S/P converter and sync cell alignment function 702 emits the sync agreement signal 728 to the sync state machine each time it identifies a sync pattern.

The cell analysing function 704 contains an internal cell size counter, not shown, that it starts when it receives the sync start signal 730. The counter is clocked by the word clock signal 732. When the cell size has been counted down the cell analysing function 704 emits to the sync state machine 706 a new cell signal 734 that indicates that a new cell is expected. The cell analysing function 704 studies the new cell to see if it has an accepted format in the size field. A non accepted code results in transmission of an error signal 736 to the sync state machine 706. The error signal 736 forces the sync state machine 706 to the state HUNT.

The cell analysing function 704 passes on, the arrow $204_p$, the found user cells for further treatment in the switch port and the switch core, respectively. A sync cell is terminated in the cell analysing function 704. The control data of the sync cell is taken out and if a prompt is indicated, cf. the earlier description with reference to FIGS. 3 and 5, a prompt signal 740 is sent to the sync cell inserting function 708. An unknown control code results in transmission of the error signal 736 to the sync state machine 706.

The function flow of the sync state machine 706 appears from the state diagram according to FIG. 3. The following rules are valid: if the sync agreement signal 728 appears in the state HUNT it will be forced to the state PRESYNC. The new cell signal 734 together with the sync agreement signal 728 forces it to the state SYNC after two consecutive sync cells. If a supervision function is used it will be reset by each new cell signal 734 together with the sync agreement signal 728. Trigging the supervision function forces the sync state machine to the state HUNT. The sync state machine 706 emits the hunt signal 726 to the S/P converter and sync cell alignment function 702 always when it is in the state HUNT, and a sync signal 742 to the sync cell inserting function 708 always when it is in the state SYNC.

The sync cell inserting function 708 uses the sync signal 742 to generate, in a control code generator 744, the control code in the outgoing sync cells and for emitting compulsory sync cells 746 to a sync cell/user cell switch function 748 when the sync signal is deactivated (indicating the state HUNT or PRESYNC). In the switch function 748 a sync cell 746 is introduced in a stream 750 of user cells when the prompt signal 740 appears. The cell stream 750 originates from a fifo 752 in which user cells coming in according to the error $204_t$ to the sync cell inserting function 708, are stopped when a sync cell is inserted in the switch function 748. The sync cell inserting function 708 uses the clock from the clock generator 710 for operating its logic, arrow 756.

The P/S converter 712 receives data in word format, arrow 758, and creates a serial bit stream forming the outgoing bit stream 722 for transmission on the link 206 to the switch port and switch core, respectively, with a speed determined, arrow 760, by the clock generator 710.

The clock generator 710 sets the bit clock and clocks the bit stream blocks 722 in the outgoing direction. The clock generator 710 could use the incoming bit clock signal 718 for attaining the same speed in both directions, as indicated with a dashed line 762. In this case the other side must be a clock master and generate the clock whereas the side using the incoming bit clock signal 718 for clocking the outgoing bit stream 722 is a slave. In such case the slave need not send the clock signal 720 further on the link 106.

Figure 8:
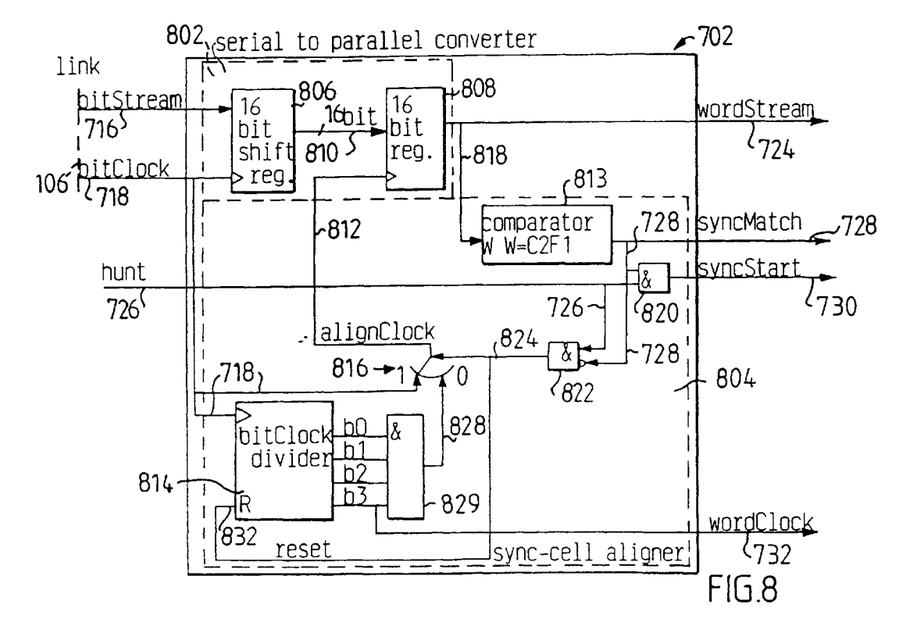
FIG. 8 shows a functional diagram of a part of the link control system according to FIG. 7 more in detail.

FIG. 8 shows the S/P converting and sync cell aligning function 702 more in detail. More particularly, it is shown as divided into a series/parallel converter 802 and a sync cell aligning function 804, internal logic being elucidated.

The series/parallel converter 802 contains a 16 bit shift register 806 and a 16 bit register 808. Controlled by the bit clock signal 818 the 16 bit shift register 806 converts the incoming bit stream to a 16 bit parallel format 810. As will appear more closely below the 16 bit register is normally clocked by an aligning clock signal 812 for each 16th bit clock pulse for completing the series/parallel convertion, and for each bit clock pulse during the search for the sync pattern.

The sync cell aligning function 804 contains a comparison function 813, a bit clock divider 814 executed as a 4 bit counter, a multiplexor 816 with some combinatory logic. The comparison function 813 is connected to the output of the register 808 for sensing, arrow 818, when the hexadecimal pattern C2F1 appears in the word stream 724. When this is the case the comparison function 813 emits the sync agreement signal 728, below also denominated equal signal, to the sync state machine 706, cf. FIG. 7. The sync agreement signal 728 multiplied with the hunt signal 726 forms the sync start signal 730. This is symbolized with an AND function 820, the two inputs of which are connected for receving the sync agreement signal 728 and the hunt signal 726, respectively, and on the output of which the sync start signal 730 is emitted when both the sync agreement signal and hunt signal appear.

The inverted sync agreement signal 728 multiplied with the hunt signal 726 controls the multiplexor 816. This is symbolized with an AND function 822 with an input connected for receiving the hunt signal 726 and an inverting input connected for receiving the sync agreement signal 728. The output 824 of the AND function 822 is connected for controlling the multiplexor 816. The multiplexor 816 is connected for receiving the bit clock signal 718 and an output signal 828 on the output of an AND gate 829, the inputs of which receive each one of the four bits appearing on the output of the counter 814. When the hunt signal 726 but not the sync agreement signal 728 appears, i.e. the output of the AND function 822 gets high, the bit clock signal 718 is chosen by the multiplexor 816 as alignment clock signal on the clock input 812 of the register 808. When both the hunt signal 726 and the sync agreement signal 728 appear, i.e. the output of the AND function 822 becomes low, the signal 828 derived from the bit clock divider 814 is chosen as an alignment clock signal. This derived clock signal is active each 16th of the time.

The 4 bit counter of the bit clock clock divider 814 counts up one step for each bit clock pulse. The bits appearing on the four outputs of the bit clock divider 814 are indicated b0, b1, b2 and b3. The most significant bit b3 is used as the word clock signal 732. The bit clock divider 814 has a reset input 832 connected to the output 824 of the AND function 822. The bit clock divider is reset when the output 824 goes high due to lack of the signal sync agreement 728 on the inverting input of the AND function 822, i.e. when the bit clock signal 718 is chosen as an alignment clock signal. When the sync pattern is found, i.e. the output 824 goes low due to the sync agreement signal 728 appearing on the inverting input of the AND function 822 the bit clock divider 832 starts counting, with restart after 16 steps.

A further example of a state machine and a transaction transition diagram between switch port and switch core for a possible synchronizing and resynchronizing scenario according to this state machine will now be described more closely with reference to FIGS. 9 and 10.

In the current example states and corresponding codes stated below will be transferred and on the receiving side result in the simultaneously stated measures:

1—SYNC. Indicates to the receiving side that the originating side is in a SYNC state.

2—PRESYNC. Informs the receiving side that the originating side is in PRESYNC state and desires a synchronizing cell in return at the first suitable point of time. The returned synchronizing cell shall be introduced in the normal cell stream so as to cause as little disturbance as possible of normal operation.

Figure 9:
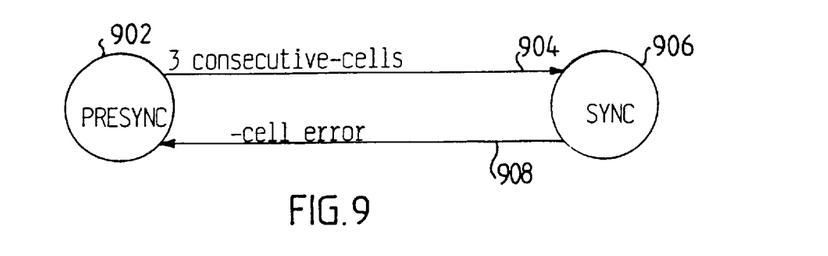
FIG. 9 shows a simplified sync state diagram for a sync state machine used in connection with performing cell synchronization in accordance with the invention.

FIG. 9 shows the sync state diagram for one side.

The incoming synchronizing cells from the opposite side of the link are compared to the predetermined pattern for synchronizing cells. In the PRESYNC state 902 and after three consecutive synchronizing cells the SYNC state 906 appears according to arrow 904. In the SYNC state 906 user cells can start flowing. The user cell contains information with respect to its size, which is used for maintaining cell synchronization in the SYNC state. A detected error in the user cells directly forces the sync state machine to the PRESYNC state 902 according to arrow 908.

To attain fast synchronization and keep the link in an operative state it is required that the state of the opposite side can be transmitted in the synchronizing cells. The states are given in the synchronizing cell specification.

The following synchronizing cell transition rules are valid for the sync state machine:

1—In the PRESYNC state. Send synchronizing cells to the opposite side with an indication regarding PRESYNC state. The switch core shall end a current transmission of user cells towards the switch port. The switch port is allowed to break or end a current transmission towards the switch core.

2—In the SYNC state. Allow transmission of user cells. Received synchronizing cells indicating PRESYNC state shall result in a corresponding synchronizing cell after the current transmission of user cells has been completed.

3—Consecutive synchronizing cells indicating PRESYNC state shall correspond to a consecutive stream of synchronizing cells after the allowed initiating delay caused by a current transmission of a user cell.

4—The switch port shall send synchronizing cells, which simulate the state PRESYNC, on a regular basis for verifying, in the state SYNC, that the switch core is in a true sync state.

Figure 10:
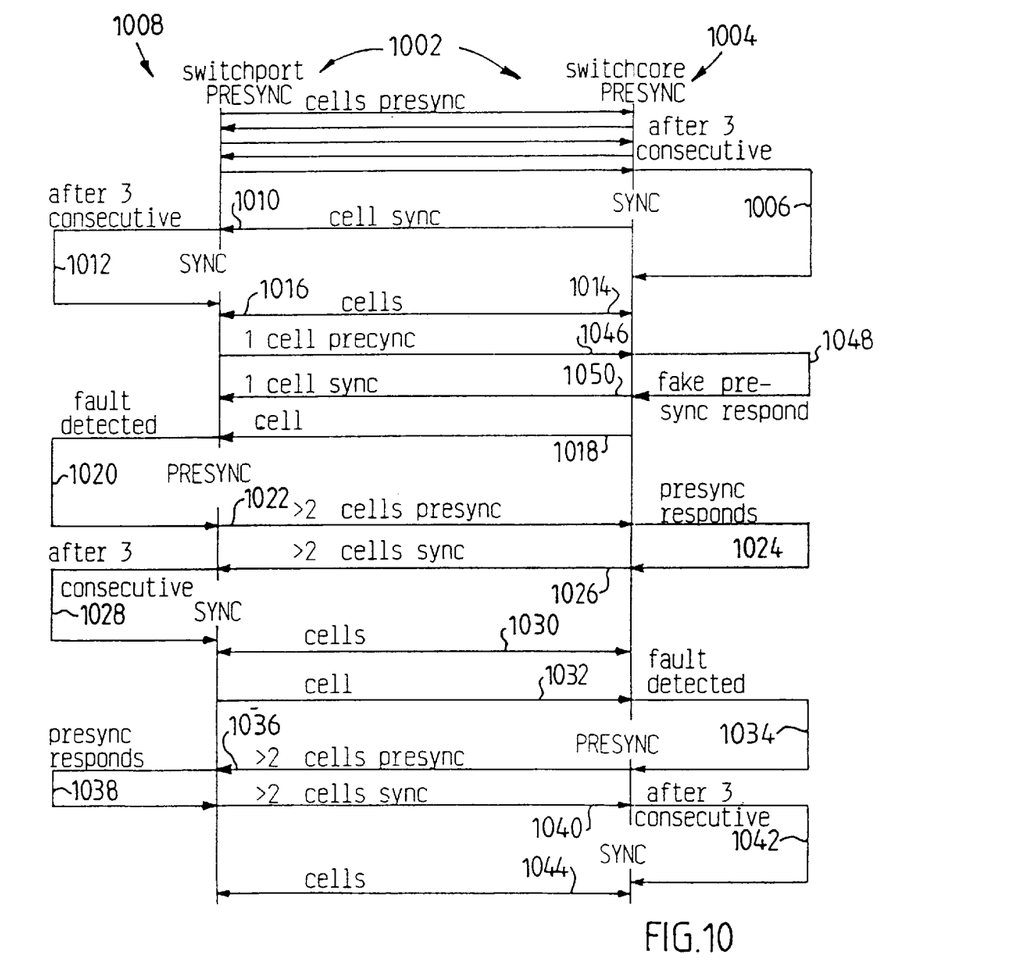
FIG. 10 shows a transaction state diagram between a switch port and switch core when using the sync state machine according to FIG. 9 for a possible practical synchronization scenario.

In FIG. 10 both sides are first in the PRESYNC state. Accordingly they send synchronizing cells, generally indicated 1002, with the state PRESYNC. After the defined number of consecutive synchronizing cells both sides enter the SYNC state, which appears at different points of time. In the example shown in the Figure the switch core 1004 first enters the SYNC state, arrow 1006, before the switch port 1008. The switch core 1004 therefore responds to its three received synchronizing cells indicating the state PRESYNC, by sending, arrow 1010, a synchronizing cell indicating the state SYNC for each received synchronizing cell indicating the state PRESYNC. After at least three consecutive synchronizing cells 1002, which have been emitted by the switch core 1004, the switch port 1008 enters the SYNC state, arrow 1012. The switch port 1008 now starts sending user cells, arrow 1014, since no synchronizing cells with the state PRESYNC arrive from the switch core 1004. The switch core 1004 now receiving user cells can in turn admit sending of user cells, arrow 1016. The link is now in operation on both sides and will remain so until either side enters the PRESYNC state due to some detected error.

In this example the switch port 1008 detects an error in a received user cell, arrow 1018, and enters, arrow 1020, the PRESYNC state. The switch port 1008 now sends synchronizing cells with the state PRESYNC, arrow 1022. The switch core 1004 must now respond, arrow 1024, by sending synchronizing cells indicating the state SYNC, arrow 1026, instead of user cells. After the required number of synchronizing cells the switch port 1008 resumes the SYNC state, arrow 1028. Thereafter both sides return to sending user cells to each other, arrow 1030.

Corresponding courses when the switch core 1004 detects an error in a received user cell, arrow 1032, is also indicated. It enters, arrow 1034, the PRESYNC state and sends synchronizing cells indicating the state PRESYNC, arrow 1036. The switch port 1008 must now respond, arrow 1038, by sending synchronizing cells indicating the state SYNC, arrow 1040, instead of user cells. After the required number of synchronizing cells the switch core 1004 resumes, arrow 1042, the synchronizing state. Thereafter both sides revert to sending user cells to each other according to double arrow 1044.

Theoretically there is a small probability that the switch core enters a false SYNC state. This implies that the synchronization is lost, but is not detected. The reason can be a correct synchronizing pattern in the user cells or an erroneous user cell head. This situation could theoretically extend over a long period of time. For handling such a situation the switch port side 1008 during normal operation can check that the switch core 1004 is really in the SYNC state by regularly emitting a synchronizing cell, arrow 1046, simulating the state PRESYNC. Within a predetermined period of time, after the current user cell transmission, the switch core 1004 shall respond, arrow 1048, with a synchronizing cell with the state SYNC, arrow 1050. If this not occurs it can be assumed that the switch core is in some kind of false SYNC state.

If no synchronizing cell is returned the sending of user cells is ended and the switch port side is forced into synchronism.

In normal operation the switch port can also secure that its own terminating side is in a real SYNC state by quite simply keeping the synchronizing cells in the simulated state PRESYNC during a time period corresponding at least to the longest user cell type.

With reference to FIGS. 11–14 a more detailed description will now be provided of a modification of a part of the link control function according to FIGS. 7 and 8. The following properties and measures are i.a. in common with the earlier embodiment. An incoming serial bit stream shall be synchronized, the serial data being converted to 16 bit parallel data, and during the alignment of the synchronizing process alignment is performed of data to correct cell limits. The incoming clock speed shall be divided down to the clock speed of the clock signal (signals) used in the switch core. In the outgoing direction, towards the switch port, the outgoing 16 bit parallel data are converted to a serial bit stream.

Figure 12:
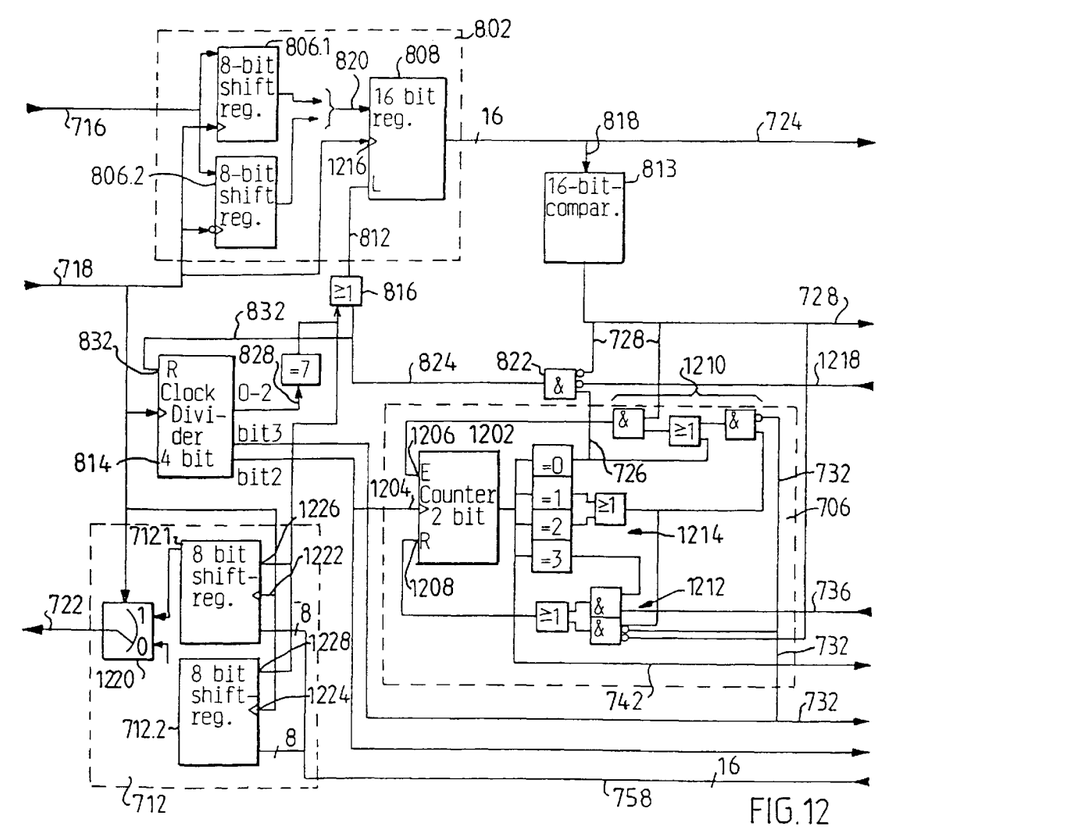
FIG. 12 shows a functional digram of a link control function in which the sync state machine according to FIG. 11 is included.

In FIG. 12 the same or corresponding parts as in FIG. 7 and 8 have been given the same reference designations.

As will appear the embodiment according to FIGS. 11–14 is based upon the understanding that the fastest possible cell synchronization while using the smallest possible amount of chip-area can be attained by using only a 16 bit comparator 813 and make synchronization pattern comparisons each clock cycle. The comparator 813 compares 16 bit data from the series/parallel converter 808 with the pattern that shall be included in the first 16 bits of the synchronization cell. The synchronization state machine 706 keeps track, referring to FIG. 11, of the current one of four synchronization states, viz. HUNT 1102, first PRESYNC 1104, second PRESYNC 1106 and SYNC 1108.

Figure 11:
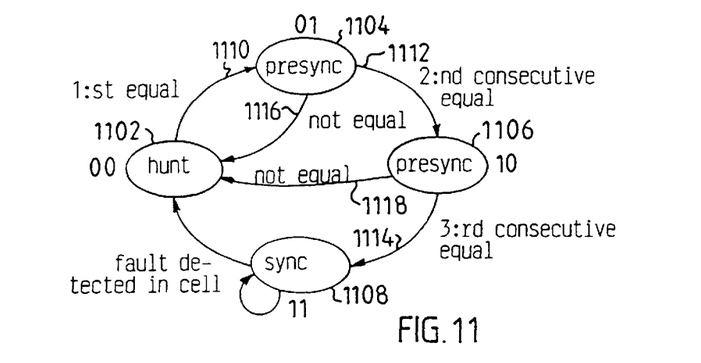
FIG. 11 shows a more detailed sync state digram for a sync state machine used in an embodiment of a link control system according to the invention as described with reference to the following Figures.

In the HUNT state 1102 the link synchronization process is active. When the comparator 813 indicates a pattern similarity the process enters the first PRESYNC state 1104, arrow 1110. After three consecutive pattern similarities, arrows 1112 and 1114, the SYNC state 1108 and normal operation can start.

In the states SYNC 1108 and PRESYNC 1104/1106 the output register 808 in the series/parallel converter 802 is loaded only once for each 16th data bit cycle, so as to provide a complete new 16 bit word after each 16th data bit. During the synchronization process the register 808 shall however instead be clocked each clock cycle (by the data clock 718 from the switch port). As a result the bits in the incoming series data stream 716 are shifted two bit positions for each data clock cycle (two bits due to data from the switch port changing on both clock edges), with a new bit in bit position 0 and bit position 1, respectively. During each clock cycle the comparator 813 scans the outgoing word stream for the synchronizing pattern. At pattern similarity the signal 728 is emitted that starts normal operation of the synchronizing unit. This implies that the register 808 is stopped from being loaded each clock cycle, a transition to the first PRESYNC state 1104 is performed according to the arrow 1110, and the clock divider 814 which has been reset during the link synchronization process starts counting from 0 up to 15. If also the next cell is a synchronizing cell the second PRESYNC state 1106 is attained according to the arrow 1112, otherwise return is performed to the HUNT state 1102 according to arrow 1116 and the link synchronization process restarts. After three consecutive synchronization pattern similarities the process enters the state SYNC 1108, arrow 1114, otherwise return is performed to the HUNT state 1102 according to arrow 1118 and the link synchronization restarts. Return to the HUNT state 1102 from the SYNC state 1108 is performed when the cell analysing unit 704 indicates that a parity error or some other error has been detected in a cell.

With the described synchronizing method all 16 possible bit positions in a cell will have been tested as start positions within a cell cycle. Only the 16 bits on the positive edge of the data clock are tested.

The cell synchronizing unit according to FIG. 12 uses both clock edges of the data clock from the switch port. The first bit of each user cell received from the switch port shall appear on the positive clock edge.

The clock divider 814 is a 4 bit counter that is used for generating the different clock signals used in the switch core. Count up is performed on the leading edge of the data clock signal 718, but only if the reset signal on the reset input 832 is not active. In the PRESYNC and SYNC states 1104/1106 and 1108, respectively, the counter 814 counts from 0 up to 15 and thereupon starts from 0 again. During the HUNT state 1102 the reset input 832 is activated. Synchronous count/reset is performed on the leading edge of the data clock 718.

The sync state machine 706 contains a two bit counter 1202, that on its counter input 1204 receives bit 2 from the clock divider 814 and keeps track of the current synchronizing state. As is also indicated in FIG. 11 00 implies HUNT state, 01 first PRESYNC state, 10 second PRESYNC state and 11 SYNC state. The four states are indicated on the output of the counter 1202 in FIG. 12 with =0, =1, =2 and =3, respectively. Synchronous count up is performed on the rear edge of the clock signal when the count is activated by an activating input 1206 being high. Synchronous reset is performed on the rear edge of the clock signal if a reset input 1208 is activated.

Count up is activated when:

HUNT state 1202 is present and an equal signal 728 from the comparator 813 is present on the activating input 1206, PRESYNC state is present and an equal signal 728 appears on the activating input 1206 during the first word of a new cell.

Reset is activated when:

SYNC state 1208 is present and an error indication 736 is optained from the cell analyser 704, PRESYNC state is present and an equal signal 728 is not obtained from the comparator 813 during the first word of a cell.

Closer details of how to attain the functions of the sync state machine described above superficially, are realized by the man of the art aided by the logic blocks shown more in detail in FIG. 12 at 1210, 1212 and 1214 and their mutual and external connections, the later with reference numerals introduced from FIG. 7.

The series/parallel converter 802 converts the serial bit stream to 16 bit parallel data. It consists of two 8 bit shift registers 806.1 and 806.2, and a 16 bit register 808. The shift register 806.1 is clocked on the leading edge by the bit clock 818, the shift register 806.2 is clocked on the rear edge. The result will be that each of the shift registers 806.1 and 806.2 are clocked every second bit cycle. This implies that when sixteen bits have been received the bits 1, 3 . . . 15 are in the register 806.1 and the bits 2, 4 . . . 16 in the register 806.2 (bit 1 is received first, bit 16 last). The first bit, i.e. bit 1, shall be received on the positive edge of the bit clock 718.

After the sixteen bits have been received the 16 bit register 808 is loaded. Synchronous loading is performed on the leading edge of the bit clock signal 718 on a clock input 1216 if the loading input 812 is activated. The loading input 812 shall be activated via the logic function 816 each time the clock divider 814 shows the value 7, or if HUNT state is present according to the output of the AND gate 822. 16-bit input data to the register 808 is selected from the 2×8 bits parallel output data from the shift registers 806.1, 806.2 in such a way that the bit positions 1, 3 . . . 15 are chosen from 806.1 and the bit positions 2, 4 . . . 16 from 806.2.

Besides the inverting input for the signal 728 from the comparator 813 and the input for the signal 726, the AND gate 822 also has an inverting input for a user cell signal 1218 from the sync cell generator 744. This signal 1218 indicates that a user cell is being transferred to the switch port. When an user cell has arisen and a change of the HUNT state has occurred, the resynchronization process will not begin until the cell transmission to the switch port has been ended.

The parallel/series converter 712 converts 16-bit parallel output data to the serial bit stream 722 towards the switch port. It consists of two 8-bit shift registers 712.1 and 712.2 and a multiplexor 1220. Both shift registers 712.1 and 712.2 are loaded at the same time by the bit clock signal 718 on clock inputs 1222 and 1224, respectively, if loading inputs 1226 and 1228, respectively, from the output 828 of the clock divider 814 are activated. The loading input shall be activated each time the 4-bit counter 814 has the value 7 or 15, on its output, which according to the above is connected to the loading inputs 1226 and 1228. The bits 1, 3 . . . 15 of the 16 bit parallel output data are loaded into 712.1, the bits 2, 4 . . . 16 are loaded into 712.2. Both shift registers 712.1 and 712.2 are clocked (shifted) on the leading edge of the bit clock 718, which implies that they are only shifted every second bit cycle. No shifting is performed if the loading input 1226 or 1228 is activated.

The multiplexor 1220 uses the bit clock at 1230 for choosing between the outputs from the two shift registers 712.1 and 712.2. If the bit clock =1 712.1 is chosen, if the bit clock =0 712.2 is chosen. The result will be that after loading of the 16 bit output data, the first bit 1 will be sent to the switch port, thereupon bit 2, whereupon the shift registers shift data, and bit 3 is sent, thereupon bit 4, etc.

The switch block 813 compares the parallel input data with the predetermined pattern of the first 16 bits in the synchronizing cell (hex'C2F1'). When the pattern matches the sync agreement signal 828 is sent.

Figure 13:
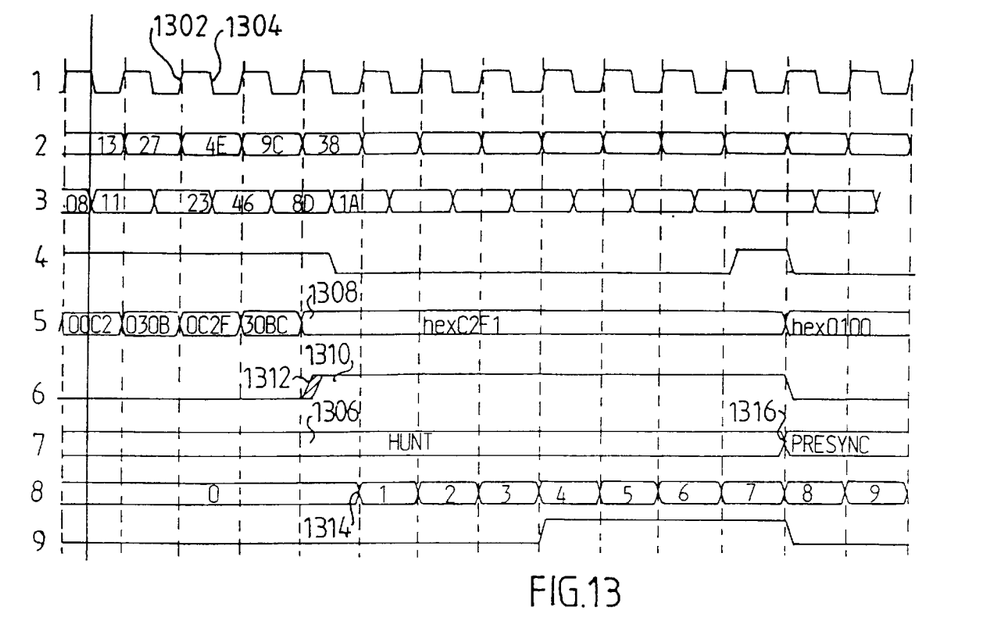
FIGS. 13 and 14 show time control diagrams of examples of link synchronization processes in the link control system according to FIG. 13.
Figure 14:
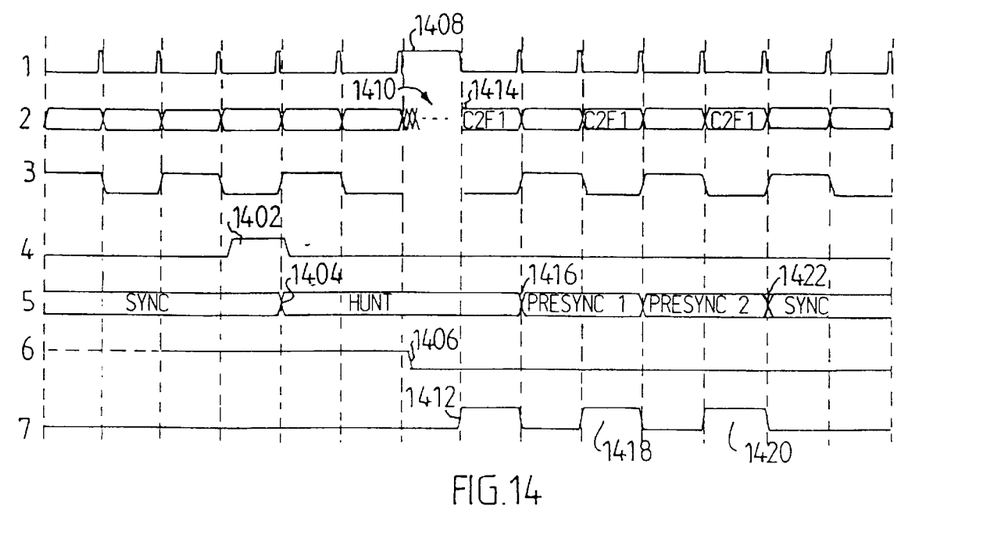

The time diagrams of FIGS. 13 and 14 illustrate the time control during the link synchronization process.

In FIG. 13 line:
1 shows the bit clock signal 718,
2 shows output data from the register 806.1,
3 shows output data from the register 806.2,
4 shows the activating signal into the loading input 812 of the 16 bit register 808,
5 shows parallel data 724 out from the register 808,
6 shows the similarity signal 728,
7 shows the sync state signal 742 from the sync state machine 706,
8 shows the count signal 828 from the 4-bit counter 814,
9 shows the bit-2 signal 1204 from the 4-bit counter 814 into the counter input of the counter 1202.

It appears from lines 1–3 in FIG. 13 how the shift registers 806.1 and 806.2 shift on each positive clock edge 1302 and negative clock edge 1304, respectively, of the signal 718. At first the synchronization unit is in the HUNT state 1202 (FIG. 11), indicated at 1306 in line 7 in the diagram, and therefore the register 808 is loaded on each positive clock edge. Each clock cycle searches the parallel data 724 of the comparison circuit 813 for finding the synchronization pattern hex'C2F1'. After some clock cycles the pattern is found, at 1308 in line 5, which is indicated by the equal signal 728 appearing in line 6 in the diagram, at 1310. The beginning of the equal signal 728 is shadowed, at 1312, for indicating that some time is needed for making the comparison and for preventing the register 808 from being loaded again during the next clock cycle. The delay must be less than one data clock cycle. When the equal signal 728 has appeared the counter 814 starts counting, at 1314 in line 8. The synchronizing state PRESYNC appears, indicated at 1316 in line 7, when the 4-bit counter 814 has the value 7 on its output 828. After three consecutive sync cells transition will be performed to the synchronization state, as will be described below with reference to FIG. 14.

FIG. 14 illustrates what will happen if an error in a cell has been detected by the cell analysing function 804. In the Figure there is indicated by line:
1 the signal 812 on the loading input 1216 of the register 808,
2 the word stream 724 from the register 808,
3 the word clock 732, i.e. bit 3 from the clock divider 814,
4 the error signal 736 from the cell analysing function 704 to the sync state machine 706,
5 the sync state signal 742 from the sync state machine 706 to the sync cell introduction block 708,
6 the user cell signal 1218 from the sync cell generator 744,
7 the equal signal 728 from the comparison function 813.

When an error in a cell has been detected by the cell analysing function 704, cf. line 4 at 1402, transition to the HUNT state appears, cf. line 5 at 1404. Due to the fact that the prevailing user cell signal 1218 from the sync cell generator 744 indicates that a cell occasionally is transferred to the switch port, the synchronization process does not start immediately. First when the current user cell signal 1218 ends, indicated at 1406 in line 6, and thereby the shift register 808 obtains the loading signal 812 on its loading input, indicated at 1408, search for synchronization is started. In line 2 this appears by the rapidly changing course at 1410 of the signal 724. In this case it will take 16 bit clock cycles before the equal signal 728 indicates, at 1412 in line 7, that the pattern at 1414 in line 2 suits. Transition to the state PRESYNC is performed at 1416 in line 5. After the three consecutive equal signals 1412, 1418, 1420 transition is performed to the synchronization state SYNC, at 1422, line 5.

The delays by gates included in FIG. 12 are very critical during the synchronization process. If a data speed of 200 Mbit/s is used each clock period is only 10 ns long. The search for the synchronization pattern and the stopping of the loading activation signal 812 to the register 808 and the reset signal 832 to the clock divider 814 must be performed during less than that time.

The delay for a gate is approximately 0,3 ns. The number of gate levels from the input of the comparator 813 to the loading input 812 of the register 808 and the reset input 832 of the clock divider 814 are about 5–6, which implies less than 1,8 ns.

The above described cell synchronization according to the invention is required due to the fact that the cell clock is not transferred. The link control could probably to a great extent be avoidable if a clock, that indicates start for each new cell is signalled over the link on both sides. It is however a desire that in case of a cell based switch the switch core shall be able to be created in one chip, where each pin however implies a cost. By using the above described method according to the invention, including that the switch core is made a clock slave, only half of the pins are required for a link.

What is claimed is:

1. A synchronizing system in a data transfer system for synchronizing transfer of data in the form of a bit stream between functional entities via a two-way link, each functional entity having means for applying arriving user data, which shall be transferred on the link, in user cells in which the number of data bits depends upon the magnitude of the respective user data, comprising:

a link control function included in each functional entity with functions for starting and controlling the transfer of data on the link by means of sync cells, which are exchanged between each link control function and each include identification information by which the sync cells can be identified, and control data which by each link control function can be given values which admit mutual check that synchronism exists, or a value which in an operational state on the link is apprehended as meaning loss of synchronism, forces the two link control functions to take measures to re-instate synchronism, said functions comprising an output function towards the link with a sync cell inserting function, that receives a stream of user cells and in this introduces sync cells, and a first transforming function, that receives the resulting stream having user cells and sync cells and transforms this to a bit stream signal, that is clocked out with a 1-bit clock signal on the link, an input function from the link comprising a second transforming function that receives a bit stream signal coming in from the link and translates this to an n-bit parallel format, that is normally clocked out for each n:th bit with an n-bit clock signal from the input function, a comparison function connected for searching and identifying in the n-bit parallel format the identification information of a sync cell, and when it is found, emitting a confirmation signal, a clocking function for enabling clocking out for each bit with a 1-bit clock signal of the n-bit parallel format from the input function, a sync state machine that receives the confirmation signal for controlling the transition from clocking of the n-bit parallel format with the n-bit clock signal to clocking with the 1-bit clock signal.

2. The system according to claim 1, further comprising a cell analysing function that receives the n-bit parallel format and analyses and identifies user cells included therein and emits an error signal to the sync state machine when detecting an error of a user cell, said error signal being likewise used by the sync state machine for said controlling.

3. The system according to claim 2, wherein the sync state machine has a HUNT state in which, due to lack of the confirmation signal it emits a hunt signal that as long as it appears provokes clocking of the n-bit parallel format with the 1-bit clock signal.

4. The system according to claim 3, wherein the HUNT state including emission of the hunt signal also appears when the sync state machine receives the error signal.

5. The system according to claim 3, further comprising means for investigating if transmission of user cells is going on, and if this is the case emitting a user cell signal, absence of which forming a further condition for clocking the n-bit parallel format with the 1-bit clock signal.

6. The system according to claim 5, further comprising a first logical circuit with an input for receiving the hunt signal, an input for receiving the confirmation signal, and an input for receiving the user cell signal, and an output which takes a hunt value corresponding to the HUNT state when the hunt signal appears at lack of the confirmation signal and user cell signal, a circuit for generating the n-bit clock signal, a second logical circuit with an input connected to the output of the first logical circuit and an input connected to the output of said circuit for generating the n-bit clocking signal, and the output of which is connected to the clocking function for forcing, when the hunt value appears on the output of the first logical circuit, the clocking function to clock the n-bit parallel format with the 1-bit clock signal.

7. The system according to claim 1, wherein the input function comprises a series/parallel converter having two parallel n/2-bit shift registers, in which every second bit of the bit stream signal is clocked in on each its edge of the 1-bit clock signal, and the outputs of which are connected to the input of an n-bit register, which has a loading input connected to the output of the second logical circuit and in which clocking in is performed with the n-bit clock signal or the 1-bit clock signal.

8. The system according to claim 7, wherein the output function includes a parallel/series converter having two parallel n/2-but shift registers in which every second bit of the user cell and sync cell stream is clocked in on an edge of the data clock signal, and the outputs of which are connected to a multiplexor controlled by the 1-bit clock signal, and the output of which is connected to the link.

9. The system according to claim 8, wherein the circuit for generating the n-bit clock signal comprises an n/4-bit clock divider, which has a clock input connected to the input for receiving a 1-bit clock signal and a reset input connected to the output from the first logical circuit.

10. The system according to claim 9, wherein the output of the clock divider that is connected to an input of the second logical circuit, also is connected to a loading input of each of the n/2-bit shift registers included in the parallel/series converter.

11. The system according to claim 3, wherein the state machine also has a PRESYNC state which, controlled by a first control data of a sync cell, is started by a confirmation signal having appeared in the HUNT state, and in which clocking of the n-bit parallel format is performed with the n-bit clock signal and the comparison function investigates a predetermined number of consecutive sync cells coming in thereafter, return being performed to the HUNT state if the confirmation signal lacks before the predetermined number of sync cells have been investigated, and a SYNC state which, as controlled by a second control data of a sync cell, is started by a confirmation signal having been received in the PRESYNC state for all of the predetermined number of sync cells, and in which transmission of data on the link is admitted while supervising data with respect to errors, transition to the HUNT state being performed if an error is found.

12. A method for synchronizing, in a cell based switch, transmission of user cells, in which the number of data bits depends upon the magnitude of the respective user data, between switch ports and a switch core via a two-way link, comprising the steps of starting and supervising transmission of data on the link by means of sync cells which are exchanged between functional entities and each contains a synchronizing pattern, by means of which the sync cell can be identified, and control data which by the functional entities can be set to values admitting mutual checking that synchronism prevails, or a value that in a state of operation on the link is apprehended as implying loss of synchronism, forcing the functional entities to take measures for reinstating synchronism, wherein starting two-way transmission of data is preceded by the functional entities sending a predetermined number of consecutive sync cells to each other, the control data of which imply a request for return of a sync cell, the control data of which has a value confirming presence of synchronism.

13. The method according to claim 12, wherein the transmission of data is started after each of the functional entities has responded to the last of the respective predetermined number of sync cells by sending the desired sync cell in return.

14. A method for synchronizing, in a cell based switch, transmission of user cells, in which the number of data bits depends upon the magnitude of the respective user data, between switch ports and a switch core via a two-way link, comprising the steps of starting and supervising transmission of data on the link by means of sync cells which are exchanged between functional entities and each contains a synchronizing pattern, by means of which the sync cell can be identified, and control data which by the functional entities can be set to values admitting mutual checking that synchronism prevails, or a value that in a state of operation on the link is apprehended as implying loss of synchronism, forcing the functional entities to take measures for reinstating synchronism, wherein the mutual check of synchronism being present is performed by the functional entities regularly sending sync cells to each other, the control data of which implies a request for return of a sync cell, the control data of which has a value confirming presence of synchronism.

15. A method for synchronizing, in a cell based switch, transmission of user cells, in which the number of data bits depends upon the magnitude of the respective user data, between switch ports and a switch core via a two-way link, comprising the steps of starting and supervising transmission of data on the link by means of sync cells which are exchanged between functional entities and each contains a synchronizing pattern, by means of which the sync cell can be identified, and control data which by the functional entities can be set to values admitting mutual checking that synchronism prevails, or a value that in a state of operation on the link is apprehended as implying loss of synchronism, forcing the functional entities to take measures for reinstating synchronism, wherein the value forcing the functional entities to take measures for reinstating synchronism is included in a predetermined number of sync cells being sent by the functional entity that has detected loss of synchronism and means a request for return of a sync cell the control data of which has a value confirming presence of synchronism.

16. A method for synchronizing, in a cell based switch, transmission of user cells, in which the number of data bits depends upon the magnitude of the respective user data, between switch ports and a switch core via a two-way link, comprising the steps of the starting and supervising transmission of data on the link by means of sync cells which are exchanged between functional entities and each contains a synchronizing pattern, by means of which the sync cell can be identified, and control data which by the functional entities can be sent to values admitting mutual checking that synchronism prevails, or a value that in a state of operation on the link is apprehended as implying loss of synchronism, forcing the functional entities to take measures for reinstating synchronism, wherein the value forcing the functional entities to take measures for reinstating synchronism, is included in a predetermined number of sync cells being sent the functional entity having detected loss of synchronism and involves a request to the other functional entity to break transmission of data and send a sync cell the control data of which has a value confirming presence of a synchronism.

17. The method according to claim 15, wherein the transmission of data is started newly the functional entity having detected loss of synchronism, after the second functional entity having answered to the last of the predetermined number of sync cells by sending the desired sync cell in return.

18. A method for synchronizing, in a cell based switch, transmission of user cells in which the number of data bits depends upon the magnitude of the respective user data between functional entities via a two-way link, comprising a link control function included in each functional entity containing functions for starting and controlling the transmission of data on the link by means of sync cells which are exchanged between the link control functions controlled by sync state machine that has three states, including a HUNT state in which the link control function is brought to investigate a sync cell coming in from the link for determining whether it agrees to a predetermined pattern for sync cells, a PRESYNC state which, in the HUNT sate, is preceded by a sync cell being in agreement with the predetermined pattern, having been found, and in which the link control function is brought to investigate a predetermined number of consecutive sync cells coming in thereafter for determining whether they agree to the predetermined pattern, return to the HUNT state being preformed if this is not the case, and a SYNC state being preceded, in the PRESYNC state, by the predetermined number of sync cells showing agreement with the predetermined pattern, and in which transfer of data on the link is admitted while supervising data with respect to errors, transition of the HUNT state being performed if an error is found wherein each sync cell includes a synchronizing pattern, by means of which the sync cell can be identified, and control data that by the link control function can be given values admitting mutual checking between the link control functions that synchronism is present, or a value that in a state of operation of the link apprehended as implying loss of synchronism, forces the link control functions to take measures for reinstating synchronism, wherein the link control function in the functional entity originating data receives the following control data in sync cells from the link control function in the receiving functional entity, including a first control data implying instruction to break a current transfer of data and instead send a sync cell, and end a current sync cell transfer for thereafter inserting the new sync cell, a second control data indicating that the state SYNC is present and implying that a sync cell shall be sent in return at a first suitable point of time in the normal cell flow so as to provoke as little disturbance as possible during normal operation, a third control data indicating that no sync cell is required in return.

19. A system according to claim 18, wherein in the states HUNT and PRESYNC of the state machine a link control function sends sync cells to the second link control function containing the first or second control data at the first suitable point of time without stopping the current cell transmission.

20. The system according to claim 18, wherein in the state SYNC of the state machine a link control function sends data to the other link control function or reacts on incoming sync cells including the first or second control data.

* * * * *